Oct. 6, 1959 J. AVINS 2,907,960

SIGNAL TRANSFER APPARATUS

Filed April 26, 1954 2 Sheets-Sheet 1

INVENTOR.
JACK AVINS
BY Orin V. Mitchell
ATTORNEY

SIGNAL TRANSFER APPARATUS

Filed April 26, 1954 2 Sheets-Sheet 2

INVENTOR.
JACK AVINS
BY Oliver Mitchell
ATTORNEY 2,907,960

SIGNAL TRANSFER APPARATUS

Jack Avins, Staten Island, N.Y., assignor to Radio Corporation of America, a corporation of Delaware Application April 26, 1954, Serial No. 425,555

13 Claims. (Cl. 333—76)

This invention relates generally to signal transfer apparatus and more particularly to signal transfer apparatus of the bandpass type suitable for such uses as in intermediate frequency amplifiers of monochrome and color television receivers, and to bandpass networks and trap or rejection circuits for use in such amplifiers.

In intermediate frequency amplifiers for monochrome television receivers, it is conventional to provide trap circuits adapted to attenuate the accompanying sound carrier relative to the picture carrier. For example, in monochrome receivers incorporating the so-called intercarrier sound system, optimum operating conditions generally require a ratio between picture carrier and sound carrier amplitudes at the output of the IF amplifier of the order of 15 to 1. Additional traps in the receiver's video circuits may be provided and tuned to the intercarrier beat to provide the further attenuation of sound components in the video channel necessary to eliminate sound interference with picture. In color receivers, however, the proper handling of sound components in IF and video circuits poses a more complicated problem. A color television composite picture signal in accordance with present FCC standards includes a color subcarrier of approximately 3.58 mc. Chroma and hue information is conveyed by sidebands of the color subcarrier, one sideband necessarily extending close to the accompanying sound components in the frequency spectrum of a color television signal. If attenuation of sound carrier relative to picture carrier in the color receiver's IF amplifier is only of the aforesaid order of 15 to 1, an objectionable beat of approximately 920 kc. (the difference between the 3.58 color subcarrier and the 4.5 intercarrier beat) appears with significant amplitude in the video output of the second detector. An interfering signal of this frequency cannot be conveniently trapped out in the subsequent video circuits. To eliminate this beat between color subcarrier and sound in the video channel, it is imperative that the sound carrier be greatly attenuated before its application to the video second detector, a non-linear circuit element wherein such a beat will otherwise be produced.

It is thus apparent that it is necessary to provide a color receiver IF amplifier with rejection networks or traps which strongly attenuate the sound carrier. From the point of view of avoidance of color crosstalk, it is desirable that the spacing between the edge of the passband and the peak rejection frequency be as narrow as possible so as to avoid unnecessary attenuation of the upper sidebands of the color subcarrier. However, with trap circuits of the character heretofore employed, the achievement of such a narrow spacing, i.e. the provision of a steep skirt for the response characteristic of the IF amplifier, is accompanied by highly undesirable phase and delay distortion of signal components in the vicinity of the sloping skirt of the response characteristic. A dilemma is thus posed, a steep-skirted response characteristic introducing non-linear phase and delay characteristics which result in erroneous color information, and a shallow-skirted response characteristic introducing color crosstalk due to unequal amplitudes of response to corresponding upper and lower sidebands of the color subcarrier. The present invention is directed toward signal transfer apparatus of a novel character which may be utilized in the IF channel of a color television receiver as a solution to the serious problem discussed above.

In accordance with the present invention, bandpass circuits are provided with novel traps operating on a cancellation principle as opposed to the absorption principle of the conventionally employed trap circuit. These novel trap circuits may provide a response characteristic with the steep slope desired, as above indicated, for sound rejection in color IF amplifiers, without introducing the objectionably non-linear phase and delay characteristics normally accompanying such sharp rejection by conventional trap circuits. In particular, embodiments of the present invention provide a novel bandpass network-trap combination in the form of a non-minimum phase shift filter, whereby, in such applications as interstage couplings for a color television receiver's IF amplifier, sharp rejection of such interfering frequencies as the accompanying sound carrier may be achieved without the phase and delay distortions inherently accompanying such sharp rejection by conventional circuits of a minimum phase shaft filter character.

In accordance with the invention the undersirable limitations of minimum phase shift filter networks are sidestepped by providing signal transfer means in which two distinct paths from input to output are provided. In accordance with a particularly simple embodiment of the present invention, the novel transfer means includes a primary or input winding and a secondary or output winding, the mutual coupling therebetween providing one of the aforesaid two paths between input and output. The second path for transfer of signal energy is provided by a pair of small link windings, one coupled to the input winding and the other coupled to the output winding, and a connection between the link windings comprising an inductance element in series with a sharply tuned parallel resonant circuit. The parallel resonant circuit in the link windings connection is tuned to a frequency slightly displaced from the desired rejection frequency. The tuning of the input and output windings (which may, for example, be tuned in a manner similar to a stagger-tuned pair) is broad to provide a desired bandpass characteristic. Throughout the major portion of the broad passband, the impedance of the sharply tuned parallel resonant circuit is negligible in determining the impedance of the aforesaid second path. The two paths are poled so that the output components contributed thereby add in the output winding throughout this region of the signal frequency spectrum. However, as the resonant frequency of the sharply tuned circuit is approached from the direction of the center of the passband, the reactance of the second path eventally changes sign, and bucking of the two output components supplied to the output winding commences. The circuit constants are adjusted such that at the desired rejection frequency, this bucking is essentially complete.

It may well be appreciated that extremely sharp rejection notches may thus be inserted in a bandpass characteristic, network response dropping from essentially full amplitude response to almost complete attenuation in an extremely narrow frequency spacing, of the order of 400 kc., at the edge of a 41.65–45.75 mc. passband, for example. While other embodiments of the present invention, wherein additional capacitive connection between the link windings, serves as one of the signal transfer paths in place of the aforesaid mutual coupling, have been developed and will be described subsequently, particular advantages of the embodiment briefly described above will be readily appreciated. The mutually coupled windings embodiment lends itself to simple alignment procedures in IF amplifier applications, since the input and output windings may be readily tuned as a staggered pair to provide an essentially flat top band-pass characteristic. High gain in the amplifying stages which the described network may couple need not be sacrificed, since the loading across grid and plate circuits is considerably higher than in a conventional double-tuned coupled circuit. A further practical advantage resides in the fact that the input and output winding (and their associated link windings) may be mounted on a single form, i.e. a single "can" may serve to house the bulk of the interstage coupling components. For high peak rejection at the desired frequency, the mutually coupled input and output windings may be bridged, in accordance with an embodiment of the invention, by a resistance element of predetermined value to better equalize the "Q's" of the two signal transfer paths so as to obtain more exact cancellation.

The significant advantage shared by all of the embodiments of the present invention resides in the essentially linear phase characteristic (and consequent constant delay) which accompanies their use. It is not believed that comparably sharp rejection of an interfering frequency could be obtained by conventional networks of a minimum phase shift filter character without departing from such desired linearity of phase and delay characteristics.

Accordingly it is a primary object of the present invention to provide novel and improved signal transfer apparatus.

It is an additional object of the present invention to provide a novel bandpass network-trap combination of a non-minimum phase shift filter character.

It is a further object of the present invention to provide a novel and improved bandpass amplifier of a type suitable for use in television receiver IF channels.

It is another object of the present invention to provide novel and improved trap circuits for television receiver IF amplifiers.

It is also an object of the present invention to provide a novel and improved color television receiver IF amplifier.

It is additionally an object of the present invention to provide novel and improved means for providing a steep skirt for the response characteristic of a bandpass network without introducing undesirable phase and delay distortions of signals in said passband.

Other objects and advantages of the present invention will be readily apparent to those skilled in the art upon a reading of the following detailed description and an inspection of the accompanying drawings in which.

Figure 3:
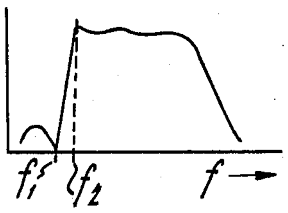
Figure 6:
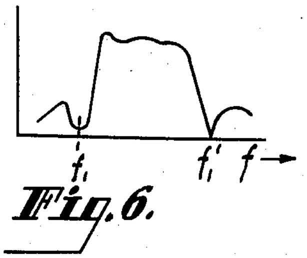
Figure 8:
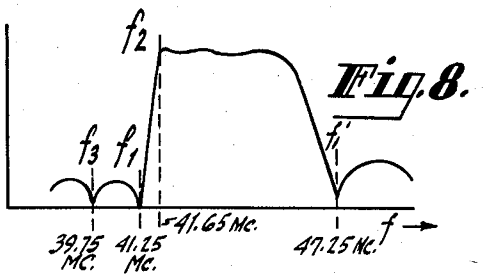

Figures 3, 6, and 8 illustrate graphically frequency response characteristics which may be obtained through use of the various illustrated embodiments of the invention.

Figure 1:
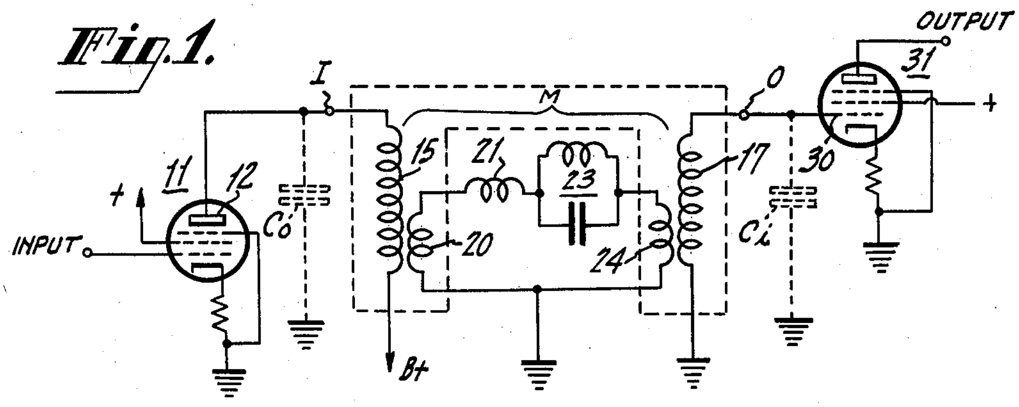
Figure 1 illustrates schematically a bandpass amplifier incorporating a bandpass network-trap combination in accordance with an embodiment of the present invention.

Refering first to Figure 1, a pair of amplifiers 11 and 31 are illustrated as comprising successive amplifying stages in a bandpass amplifier, which may, for example, be the IF amplifier of a color television receiver. Input signals, which may be derived from the preceding IF amplifier stage, or from the receiver's RF converter, etc., appear at the terminal labeled "input" and are applied to the control grid of the amplifier 11. The output electrode, anode 12, of the amplifier 11 is connected to the input terminal "I" of a novel interstage coupling network in accordance with an embodiment of the present invention. The output terminal "O" of the novel network is connected to the control grid 30 of amplifier 31. Output signals are derived from a terminal labeled "output" connected to the anode of amplifier 31.

The novel interstage coupling network includes a pair of windings 15 and 17, with mutual inductive coupling therebetween (as indicated by the M-bracket symbol on the drawing). The primary or input winding 15 is connected between the input terminal "I" and a point of B+ potential, the anode 12 thus deriving its operating potential from a suitable B+ source (not shown) via a D.-C. path including the input winding 15. The output winding 17 is connected between the output terminal "O" and a point of reference potential (i.e. ground in the illustrative embodiment). A first path for the transfer of signal energy from amplifier 11 and input terminal "I" to output terminal "O" and amplifier 30 is thus seen to be supplied by the mutual coupling between the input winding 15 and the output winding 17.

A second such signal transfer path, however, is also provided in accordance with the principles of the present invention. Associated with the input winding 15 and mutually inductively coupled thereto is a winding 20, which may be a relatively small, so-called 'link" winding, while another such winding 24 is associated with the output winding 17 and mutually inductively coupled thereto. There is no mutual coupling between the respective link windings 20 and 24, but a signal path therebetween is provided in the form of a connection between respective ends of the link windings which includes an inductive element 21 in series with a parallel resonant circuit 23. A ground connection is provided for the other respective ends of the link windings. The second path for transfer of signal energy from input terminal "I" to output terminal "O" thus includes the series combination of inductance element 21 and resonant circuit element 23.

The characteristics and principles of operation of this interstage coupling network and its components whereby a sharply notched bandpass characteristic may be obtained shall now be described. The mutually coupled input and output windings 15 and 17 may be broadly tuned, as in the well-known manner of a staggered pair, for example, to provide a desired bandpass characteristic. The parallel resonant circuit 23 in the connecting path between link windings 20 and 24 may be sharply tuned to a frequency slightly shifted from the peak rejection frequency in the desired rejection band. The frequency response characteristic may thus be of the type illustrated in Figure 3 wherein the roughly flat-topped bandpass curve provided by the staggered pair tuning is provided with a steep-skirted rejection notch at the lower frequency end thereof. The basis for the achievement of the sharp drop in response between essentially full amplitude response at a frequency $f_2$ and the essentially complete attenuation at the peak rejection frequency $f_1$, as indicated in Figure 3, resides in the difference in phase relationships between the output signal components contributed by the two signal transfer paths at these frequencies. That is, the two signal transfer paths are poled such that the output components contributed thereby add in the output winding throughout the passband down to the edge frequency $f_2$. At signal frequencies in the passband, the impedance of the shraply tuned parallel resonant circuit 23 is small, and the impedance of the signal transfer path in which it is included is essentially determined only by inductance 21. However, as the resonant frequency of the sharply tuned circuit 23 (which in the Figure 3 example would be a frequency slightly lower than $f_1$) is approached by lowering the signal frequency toward $f_2$, the capacitive reactance presented by resonant circuit 23 becomes appreciable relative to the inductive reactance of element 21, and the contribution of the second path to the output sum reaches a maximum at $f_2$, the frequency of series resonance for the components 21 and 23. At frequencies below this series resonant frequency, the series combination 21—23 appears capacitive and the contribution of the second path no longer reinforces, but now subtracts from the output component transferred by mutual coupling. The circuit constants are adjusted such that at the desired peak rejection frequency $f_1$, this bucking or cancellation is essentially complete.

It may be appreciated that the steepness of the response slope approaching the peak rejection frequency thus obtained is limited only by the attainable sharpness of tuning or "Q" of the parallel resonant circuit 23. A significant advantage in the achievement of such sharp rejection by the desired apparatus, as noted previously, is that substantially little phase and delay distortion for frequencies in the passband accompanies this form of rejection. Down to the edge frequency $f_2$, the phase characteristic of the network is essentially the linear one associated with the stagger-tuned pair response. While steeper attenuation slopes are readily attainable through practice of the present invention, a practical $f_1—f_2$ spacing in use of the network for sound rejection in a color television receiver IF amplifier is one of the order of 400 kc.

Figure 2:
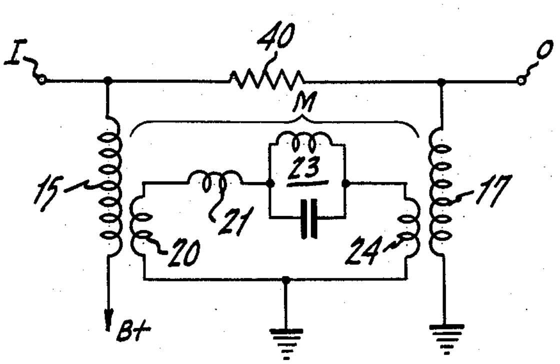
Figure 2 illustrates schematically a modification of the circuits of Figure 1 in further accordance with an embodiment of the present invention.

In Figure 2, a modification of the circuit of Figure 1 is shown whereby in a practical circuit, more exact cancellation at $f_1$ may be achieved. As illustrated, the modification comprises the addition of a resistor connected between input terminal "I" and output terminal "O," effectively bridging the first signal transfer path. The bridging resistor 40 serves to more exactly equalize the "Q's" of the two signal transfer paths so that more exact opposition in phase of the mutually bucking components may occur at the peak rejection frequency $f_1$.

Figure 4:
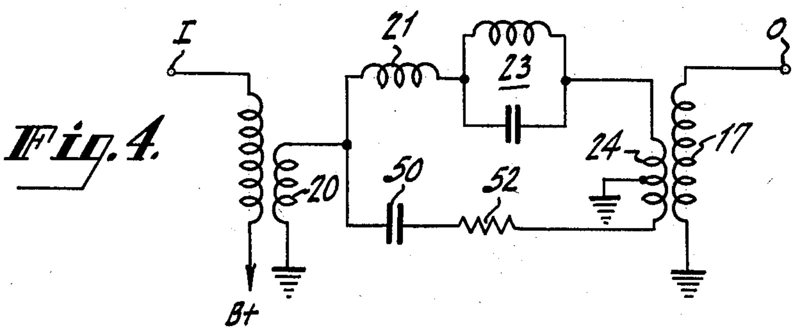
Figures 4 and 5 illustrate schematically bandpass network-trap combinations in accordance with other embodiments of the present invention.

In Figure 4 a modification of the network of Figure 1 in accordance with another embodiment of the present invention is shown. It is noted that in the modified network of Figure 4, there is no mutual inductive coupling between the input winding 15 and the output winding 17. Instead, the two signal transfer paths are effectively parallel paths interconnecting the link windings 20 and 24, one path again comprising the series combination of inductance 21 and parallel resonant circuit 23, the other comprising capacitor 50 in series with a resistor 52. It will be appreciated that the operation of the modified network of Figure 4 is similar to that described for Figure 1, the output signal components contributed by the two paths adding in the passband, but mutually cancelling at the rejection frequency. However, it is noted that in this embodiment it is necessary to return a center tap on the link winding 24 to ground or other reference potential point so that the cancelling effects may be obtained. The inclusion of resistor 52 in series with capacitor 50 is not essential, the purpose for its inclusion in the illustrated embodiment being similar to that of the bridging resistor 40 of Figure 2, i.e. to equalize the Q's of the two signal paths so that phase opposition of the output components at the rejection frequency $f_1$ may be more exact with the result of more complete attenuation at this frequency. Such Q-equalizing purposes may alternatively be served by shunting a resistor across capacitor 50.

Figure 5:
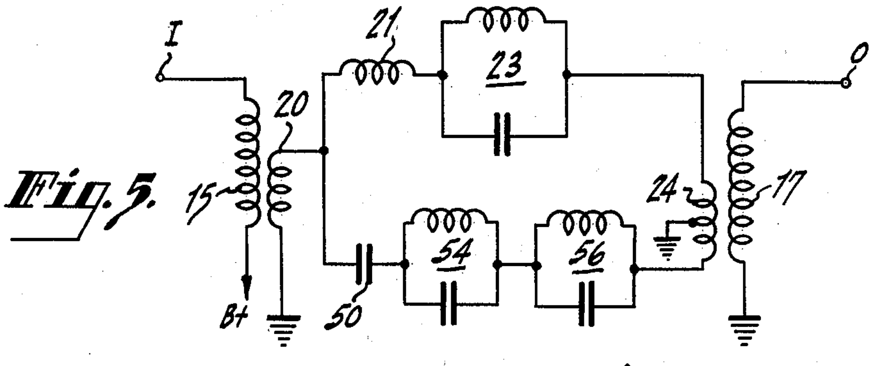

Figure 5 illustrates a more complex version of the network of Figure 4 in accordance with a further embodiment of the present invention whereby a response characteristic of the type illustrated in Figure 6 may be achieved. In the response characteristic of Figure 6, a broader rejection notch surrounding $f_1$ is achieved in comparison with the characteristic of Figure 3, and trapping at a frequency $f_{1'}$ at the opposite end of the passband is also obtained. As illustrated in Figure 5, a modification of the network of Figure 4 to achieve such a characteristic may simply comprise insertion of a pair of parallel resonant circuits 54 and 56 in series with capacitor 50 in its signal path, one of the added "tanks" being resonant near $f_{1'}$ to provide the trapping action at that frequency, and the other tank being tuned to a frequency in the vicinity of $f_1$ and related to the resonant frequency of circuit 23 such that the rejection notch surrounding $f_1$ is effectively broadened.

Figure 7:
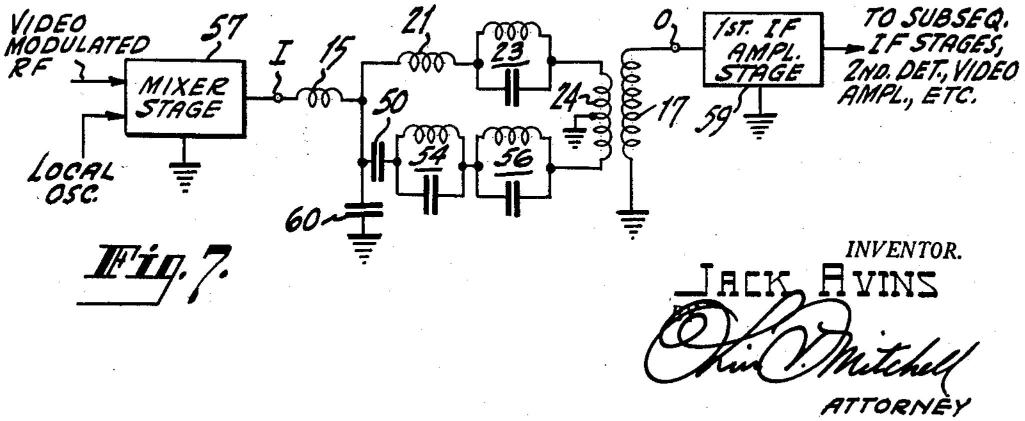
Figure 7 illustrates in block and schematic form the application of a particular embodiment of the present invention to use in coupling the mixer and first IF stages of a television receiver.

In Figure 7, a slightly modified version of the network shown in Figure 5 is illustrated schematically as serving as the interstage coupling between the mixer stage 57 and the first IF amplifying stage 59 of a color television receiver. As in the embodiment of Figure 5, one of the parallel signal transfer paths includes in series with the capacitance 50 a pair of tank circuits, 54 and 56. A point of difference resides, however, in the manner of coupling of the two signal transfer paths to the input winding 15: "bottom" capacitive coupling, through use of a capacitor 60 connected between ground and a junction point of direct connection between the input winding 15 and the input ends of the two parallel paths, being substituted for the use of mutual inductive coupling via the link winding 20. The substitute coupling arrangement of Figure 7 is particularly desirable where a network in accordance with the present invention is utilized, as indicated therein, to couple the output of the receiver's mixer stage to the input of the receiver's IF amplifier, so as to minimize the possibilities of radiation of the locally generated oscillations applied to the mixer stage.

Figure 8 illustrates graphically another representative frequency response characteristic which may be obtained through use of an embodiment of the present invention, such as the one illustrated in Figure 7. The response characteristic of Figure 8 resembles the characteristic of Figure 6 in that strong attenuation is provided at frequencies $f_1$ and $f_1'$, at either end of a desired passband, but differs from the characteristic illustrated in Figure 6 in that the relatively wide rejection notch surrounding $f_1$ is not provided, but an additional peak rejection frequency is provided at $f_3$ (below $f_1$). The characteristic of Figure 8 is a particularly desirable characteristic for the coupling between the mixer output and IF amplifier input of a color television receiver. It may be readily achieved with the network of Figure 7 through the tuning of one of the tanks 54 and 56 to a frequency in the vicinity of $f_1'$, and the tuning of the other of said pair of tanks to a frequency in the vicinity of $f_3$. The sharp drop in response from the passband edge frequency $f_2$ to the peak rejection frequency $f_1$ is achieved in the same manner as previously discussed with respect to the other embodiments of the present invention.

As indicated by the frequency values shown in Figure 8 the frequencies $f_1$, $f_2$, $f_1'$, and $f_3$ may specifically be 41.25, 41.65, 47.25 and 39.75 mc., respectively, in the indicated color television receiver utilization. Thus, the illustrated network may provide adjacent channel picture carrier ($f_3$) rejection and adjacent channel sound carrier ($f_1'$) rejection as well as the desired form of accompanying sound carrier ($f_1$) rejection whereby spacing to the edge ($f_2$) of the passband is of the order of 400 kc. As in the other discussed embodiments the achievement of such a narrow $f_1$-$f_2$ spacing without introduction of phase distortions effectively permits the sound rejection requisite for elimination of troublesome beats without interfering amplitude-wise or phase-wise with the color subcarrier sideband components of the color television signal being transferred.

While the embodiments of Figures 4, 5 and 7 are satisfactory in operation for such purposes as the aforesaid use as sound rejecting interstage coupling networks of television receiver IF amplifiers, certain advantages of the embodiments shown in Figures 1 and 2 may be noted. Inasmuch as these latter embodiments call for a mutual coupling relationship between the input and output windings 15 and 17, it is convenient in practice to mount these windings on a common coilform (along with the respectively associated link windings), and these components may readily be included in a single "can" or shielded container, there being no requirement for shielding windings 15 and 17 from each other. Also it may be noted that the embodiments of Figures 1 and 2 do not require the use of a center tap connecting to link winding 24, as do the embodiments of the Figures 4, 5 and 7.

Having thus described my invention, what is claimed is:

1. Signal transfer apparatus comprising the combination of a signal input terminal, a signal output terminal, means coupled between said input and output terminals effectively providing a pair of signal transfer paths for the transfer of signal energy from said input terminal to said output terminal, said paths being poled relative to one another so as to contribute respective output signal components to said output terminal which bear phase relationships such as to reinforce one another for signal frequencies throughout a predetermined range, and one of said paths comprising means for reversing said phase relationship in a portion of the signal frequency spectrum surrounding a predetermined rejection frequency and outside said predetermined range whereby said output components tend to mutually cancel in said portion of the signal frequency spectrum, said one signal transfer path including the series combination of a parallel resonant circuit and a reactive element, said parallel resonant circuit being tuned to a frequency in said portion of the signal frequency spectrum, the reactance of said series combination being opposite in sign at said predetermined rejection frequency from the reactance of said series combination throughout said predetermined range.

2. Signal transfer apparatus comprising in combination an input winding, an output winding, means for applying signals to said input winding, means for establishing a first transfer of signal energy from said input winding to said output winding, means for establishing a second transfer of signal energy from said input winding to said output winding, said signal transfer establishing means being poled relative to one another so that the signal energy transfer by one reinforces the signal energy transfer by the other throughout a broad band of signal frequencies, one of said signal transfer establishing means including reactive means having one sign of reactance throughout said broad band, and the opposite sign of reactance in a relatively narrow band adjacent to said broad band in the signal frequency spectrum for causing signal energy transfer to said output winding by said one signal transfer establishing means to substantially cancel the signal energy transfer to said output winding by the other of said signal transfer establishing means at a predetermined rejection frequency within said relatively narrow band, said reactive means comprising the series combination of a parallel resonant circuit and an inductive element.

3. Signal transfer apparatus in accordance with claim 2 wherein the other of said signal transfer establishing means comprises means for mutually inductively coupling said input winding and said output winding.

4. In a television receiver IF amplifier including a plurality of cascaded stages, means for transferring composite television signals from the output electrode of one of said stages to the input electrode of the succeeding stage comprising in combination an input winding coupled to said output electrode, an output winding coupled to said input electrode, said input and output windings being mutually inductively coupled, a third winding inductively coupled to said input winding, a fourth winding inductively coupled to said output winding, and a connection between said third and fourth windings including the series combination of a parallel resonant circuit and a reactive element.

5. In a television receiver IF amplifier, signal transfer apparatus in accordance with claim 4 wherein said composite television signals include an accompanying sound carrier at a predetermined frequency, and wherein said parallel resonant circuit is relatively sharply tuned to a frequency slightly below the predetermined frequency of said accompanying sound carrier.

6. In a television receiver IF amplifier, signal transfer apparatus in accordance with claim 5 wherein said composite television signals include picture signals falling in a predetermined relatively broad band of frequencies, and wherein the sign of the reactance of said series combination at said accompanying sound carrier frequency is opposite to the sign of the reactance of said series combination at signal frequencies within said relatively broad band.

7. In a television receiver IF amplifier, signal transfer apparatus in accordance with claim 6 wherein said input and output windings are tuned as a stagger-tuned pair.

8. In a color television receiver IF amplifier including a plurality of cascaded stages and receiving composite color television input signals including an accompanying sound carrier, means for transferring signals from the output terminal of one of said stages to the input terminal of the succeeding stage comprising in combination an input winding coupled to said output terminal, an output winding coupled to said input terminal, means for establishing a pair of signal transfer paths between said input winding and said output winding, said signal transfer paths being poled relative to one another so as to supply output signal components to said output winding in reinforcing phase relationship throughout a predetermined portion of the frequency spectrum of said composite input signals, one of said signal transfer paths comprising the series combination of a parallel resonant circuit and a reactive element, said series combination presenting a reactance of one sign at signal frequencies in said predetermined spectrum portion and presenting a reactance of the opposite sign at the frequency of said accompanying sound carrier such that said output signal components are supplied to said output winding in opposing phase relationship at said sound carrier frequency.

9. Signal transfer apparatus comprising in combination an input winding, an output winding, means for applying signals to said input winding, means for establishing a first transfer of signal energy from said input winding to said output winding, means for establishing a second transfer of signal energy from said input winding to said output winding, said signal transfer establishing means being poled relative to one another so that the signal energy transfer by one reinforces the signal energy transfer by the other throughout a broad band of signal frequencies, one of said signal transfer establishing means including reactive means having one sign of reactance throughout said broad band, and the opposite sign of reactance in a relatively narrow band adjacent to said broad band in the signal frequency spectrum for causing the signal energy transfer to said output winding by said one signal transfer establishing means to substantially cancel the signal energy transfer to said output winding by the other of said signal transfer establishing means at a predetermined rejection frequency within said relatively narrow band, said reactive means including an inductance in series with a relatively high "Q" parallel resonant circuit, said other signal transfer establishing means including a capacitance.

10. Signal transfer apparatus in accordance with claim 9 wherein said other signal transfer establishing means also includes an additional pair of relatively high "Q" parallel resonant circuits in series with said capacitance.

11. In a television receiver, signal transfer apparatus in accordance with claim 10 wherein said first-mentioned parallel resonant circuit is tuned to a frequency in the immediate vicinity of the accompanying sound carrier frequency of a composite television signal applied to said input winding.

12. In a television receiver, signal transfer apparatus in accordance with claim 10 wherein said additional pair of parallel resonant circuits are tuned to adjacent channel sound and picture carrier frequencies respectively.

13. Signal transfer apparatus comprising the combination of a signal input terminal, a signal output terminal, means coupled between said input and output terminals effectively providing a pair of signal transfer paths for the transfer of signal energy from said input terminal to said output terminal, said paths being poled relative to one another so as to contribute respective output signal components to said output terminal which bear phase relationships such as to reinfroce one another for signal frequencies throughout a predetermined range, and one of said paths comprising means for reversing said phase relationship in a portion of the signal frequency spectrum surrounding a predetermined rejection frequency and outside said predetermined range whereby said output components tend to mutually cancel in said portion of the signal frequency spectrum, said one signal transfer path including the series combination of a parallel resonant circuit and a reactive element, said parallel resonant circuit being tuned to a frequency in said portion of the signal frequency spectrum, the reactance of said series combination being opposite in sign at said predetermined rejection frequency from the reactance of said series combination throughout said predetermined range, the other of said signal transfer paths being provided by mutual inductive coupling between an input winding coupled to said input terminal and an output winding coupled to said output terminal.

References Cited in the file of this patent

UNITED STATES PATENTS

| | | |
|---|---|---|
| 1,759,952 | McCurdy | May 27, 1930 |
| 1,828,454 | Bode | Oct. 20, 1931 |
| 1,896,065 | Budenbom | Feb. 7, 1933 |
| 1,956,121 | Craig | Apr. 24, 1934 |
| 2,052,338 | Budenbom | Aug. 25, 1936 |
| 2,064,774 | Wheeler | Dec. 15, 1936 |
| 2,161,593 | Rust | June 6, 1939 |
| 2,167,079 | Landon | July 25, 1939 |

FOREIGN PATENTS

| | | |
|---|---|---|
| 710,535 | France | June 8, 1931 |

OTHER REFERENCES

Pickens et al.: Electronics, vol. 23, No. 5, May 1950, pages 96–99.

UNITED STATES PATENT OFFICE

CERTIFICATE OF CORRECTION

Patent No. 2,907,960 October 6, 1959

Jack Avins

It is hereby certified that error appears in the printed specification of the above numbered patent requiring correction and that the said Letters Patent should read as corrected below.

Column 2, line 26, for "shaft" read -- shift --; column 4, line 67, for "shraply" read -- sharply --.

Signed and sealed this 9th day of August 1960.

(SEAL)
Attest:

KARL H. AXLINE
Attesting Officer

ROBERT C. WATSON
Commissioner of Patents